United States Patent [19]
Jensen, Sr.

[11] 3,861,492
[45] Jan. 21, 1975

[54] MOTORIZED ICE BIKE
[75] Inventor: Elmer R. Jensen, Sr., Toms River, N.J.
[73] Assignee: Raymond Lee Organization Inc., New York, N.Y.
[22] Filed: Jan. 16, 1973
[21] Appl. No.: 324,058

[52] U.S. Cl................................ 180/3 R, 280/7.14
[51] Int. Cl.............................................. B62m 27/00
[58] Field of Search....... 180/3, 7 P; 280/7.11, 7.12, 280/7.14; 115/1 C; 114/43

[56] References Cited
UNITED STATES PATENTS

| | | | |
|---|---|---|---|
| 508,011 | 11/1893 | Gould | 280/7.14 |
| 1,146,210 | 7/1915 | Steen | 280/7.14 |
| 1,547,822 | 7/1925 | Reichling | 280/7.12 |
| 2,987,281 | 6/1961 | Schurr et al. | 115/1 C |

*Primary Examiner*—Leo Friaglia
*Assistant Examiner*—R. Schrecengost
*Attorney, Agent, or Firm*—Howard I. Podell

[57] ABSTRACT

An air propelled ice or snow vehicle which is fabricated by the modification of a motorized bicycle or mini-bike and a standard kit of parts.

The modified vehicle is mounted on three ice skates, with the rear two skates mounted on a rear outrigger which protrudes sidewise and the front skate mounted on a front outrigger member. The vehicle is propelled by a pusher propeller driven by a gasoline motor mounted directly behind the seat of the driver.

2 Claims, 4 Drawing Figures

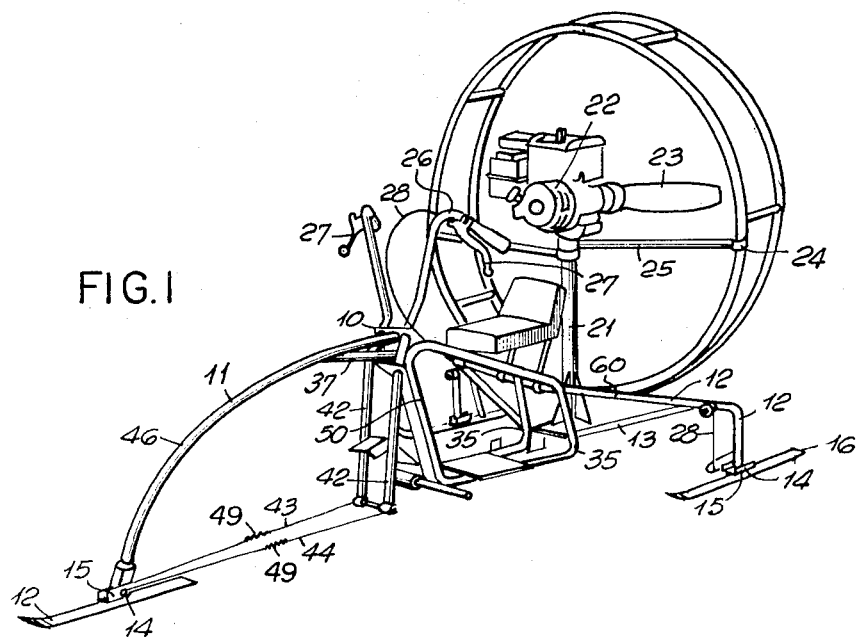

MOTORIZED ICE BIKE

SUMMARY OF THE INVENTION

This invention relates to a motorized air propelled snow or ice vehicle, and particularly to such a vehicle which may be fabricated from a mini-bike by the use of a standard kit of parts.

The advantage of this invention is that modified vehicle will track readily over snow or icy terrain and is equipped with brakes for safe handling. The standard set of modification parts will fit most types of mini-bikes, providing ready conversion of such bicycles to a vehicle which provides winter sport participation.

A conventional wheeled motorized mini-bike is converted by removing the bicycle wheels and motor, and clamping the front outriggers to the steering post and the rear outrigger and motor mount to the frame of the mini-bike. The brakes on the rear outrigger are attached by cables to the conventional brake handle controls of the mini-bike handles. The mini-bike motor is mounted on the upraised platform of the motor mount and connected to a pusher air propeller. A propeller guard is clamped to the motor mount for safety purposes. When desired, an alternate five horsepower gasoline motor may be substituted for the motor supplied with the mini-bike, in which case the mini-bike motor is left in its customary place.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the converted ice vehicle;

FIG. 2 is a fragmentary perspective view of the front outrigger brace;

FIG. 3 is a fragmentary perspective view of the front skate and brace; and

FIG. 4 is a fragmentary view of the rear skate, brake and brace.

DESCRIPTION OF THE PREFERRED EMBODIMENT

Turning now descriptively to the drawings, in which similar reference characters denote similar elements throughout the several views, FIG. 1 illustrates the completed ice vehicle 10 which is converted from a wheeled mini-bike by the installation of a set of modification parts and assemblies.

The front outrigger unit 11, as shown in FIG. 1-3, is comprised of a welded unit of a forward brace 46, and two vertical posts 42 which are shaped at their upper ends to form handlebars 26. The attachment of the forward brace 46 to neck posts 38 is reinforced by a welded stay 37 which joins the forward brace 46 to the brace mount 48. The brace mount 48 is welded to the two vertical posts 42. The forward brace 46 and the welded stay 37 are fastened by means of two U-bolts to the neck post 38 which is conventionally welded to the mini-bike frame 50.

The forward skate 12 is fitted with a caster unit 15 welded to the upper surface of the skate 12, with the caster unit 15 rotatably fastened to the forward brace 46 by means of a horizontal bolt 14, permitting the forward skate 12 to rotate in the vertical plane. Steering cables 43 are mounted to each extremity of the horizontal bolt 14 of the forward skate 12 and are fastened to the lower extremity of each vertical post 42 for maintaining horizontal alignment of the forward skate 12. The steering tension cables 43 and 44 reinforce brace 46 in the transfer of steering torque between vertical posts 42 and the front skate 12. Cables 43 and 44 are each fitted with a turn buckle 49 for use in adjusting cables 43 and 44 to the desired tension.

The rear outrigger assembly 60 is fastened to the frame 50 of the mini-bike by brackets 35 and comprises a welded assembly of the vertical motor post 21 to which the motor 22 and attached propeller 23 is fastened at the top, and two welded side braces 12 and attached stays 13 on each side of the vehicle to each of which a rear skate 16 is each rotatably fastened by means of bolt 14 which fits the caster unit 15 welded to each skate 16. A brake plate 32 is also rotatably fastened to each bolt 14 of rear skate 16, with the rear end of the brake plate 33 curved downwards so as to dig into the terrain when the opposite end 37 of the brake plate 32 is pulled upwards by attached cable 28. Tension spring 31 is fastened to the braking end 33 of the brake plate 32 and the side brace 12 so as to maintain the brake end 33 above the level of the skate plate 16, when not in use. Brake cable 28 of each rear brake 32 runs over a free running pulley 29 fastened to the side brace 12 by bolt 30. Each brake cable 28 is attached at its other end to a brake lever 27 rotatably mounted to one handle post 26, to permit each brake to be individually controlled for steering purposes.

A circular propeller guard unit 24 is fixed by radial members 25 to the motor post 21.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A kit of parts for converting a wheeled motorized mini-bike to a motorized air propelled ice vehicle, with said parts being attachable to the frame of the mini-bike by means of mounting brackets, comprising a front outrigger unit and a rear outrigger unit, with the front outrigger unit comprising a brace which is fitted by a bolt at its lower end to a flat skate mounted so as to be able to rotate in a vertical plane about the axis of the bolt, with the brace being formed in a curved shape so that at its upper end it is adapted to be attached to the mid-section of two vertical post members of the mini-bike frame, said post members being joined together, said brace by a fitting being joinable to the front neck of the mini-bike by U-bolts, with the upper end of each post member being curved to form a handlebar, and with a tension cable, at one end, is adapted to be attached to the lower end of each post member, said cable, at the other end, is attached to the respective side end of the bolt which fastens the front skate to the brace to transfer horizontal steering torque between the front skate and the two post members, with a rear outrigger unit which extends to each side of the vehicle when attached by mounting brackets to the rear of said frame of the mini-bike, with each side of the rear outrigger being curved in the vertical plane so that a rear skate may be attached to each side end of the outrigger, said attachment permitting the skate to rotate in a vertical plane, with a brake member fastened to each end of the outrigger and means to rotate the brake member in a vertical plane together with a vertical post mounted in the mid-section of the rear outrigger to serve as a support for an attached motor mount platform at the upper end of said rear vertical post on which a gasoline motor and attached propeller may be mounted so as to propel the vehicle when operated.

2. A motorized air propelled ice vehicle fabricated from the frame of a mini-bike and a kit of parts, with the parts of the said kit attached to the frame of the mini-bike by means of mounting brackets, comprising a frame of a mini-bike, a front outrigger unit and a rear outrigger unit, with the front outrigger unit comprising a brace which is fitted by a bolt at its lower end to a flat skate mounted so as to be able to rotate in a vertical plane about the axis of the bolt, with the brace being formed in a curved shape so that at its ends, it is adapted to be attached to the mid-section of two vertical post members of the mini-bike frame, said post members being joined together, said brace by a fitting joinable to the front neck of the mini-bike by U-bolts, with the upper end of each post member being curved to form a handlebar, and with a tensioning cable, at one end, which is adapted to be attached to the lower end of each post member, said cable, at the other end being attached to the respective side end of the bolt which fastens the front skate to the brace to transfer horizontal steering torque between the front skate and the two post members, with a rear outrigger unit which extends to each side of the vehicle when attached by mounting brackets to the rear of said frame of the mini-bike, with each side of the rear outrigger being curved in the vertical plane so that a rear skate may be attached to each side end of the outrigger, said attachment permitting the skate to rotate in a vertical plane, with a brake member fastened to each end of the outrigger, and means to rotate the brake member in a vertical plane, together with a vertical post mounted in the mid-section of the rear outrigger to serve as a support for an attached motor mount platform at the upper end of said rear vertical post on which a gasoline motor and attached propeller may be mounted so as to propel the vehicle when operated.

* * * * *